Aug. 16, 1932.  C. J. W. CLASEN  1,871,778

RAILWAY CAR TRUCK

Filed Feb. 18, 1928

INVENTOR
C. J. W. Clasen
BY
Evans + McCoy
ATTORNEYS

Patented Aug. 16, 1932

1,871,778

UNITED STATES PATENT OFFICE

CLAUS J. WERNER CLASEN, OF DAVENPORT, IOWA, ASSIGNOR TO THE BETTENDORF COMPANY, OF BETTENDORF, IOWA, A CORPORATION OF IOWA

RAILWAY CAR TRUCK

Application filed February 18, 1928. Serial No. 255,228.

This invention relates to railway car trucks and has for its object to provide a truck in which the wheel carrying axles serve as cross members connecting the side frame members and holding them against relative movements longitudinally of the axle, and further, to provide a truck construction in which the side frame members may be mounted closely adjacent the outer side faces of the supporting wheels.

A further object of the invention is to provide a truck in which the axially alined wheels on opposite sides of the truck are rotatable on the axles, but rigidly connected with each other for simultaneous rotation and in which each of the wheels is provided with an anti-friction bearing by which it is rotatably supported on the axle.

A further object is to provide a wheel unit in which a pair of supporting wheels are rigidly secured one upon each end of a rigid tubular connecting member which has an internal diameter sufficiently large to receive the supporting axle, and further, to provide anti-friction bearings beyond the ends of the tubular member between each of the wheels and the supporting axle, which serves to rotatably support the unit on the axle and to position the tubular connecting member clear of the axle.

A further object of the invention is to provide a wheel unit such as above described in which the wheels are placed onto the ends of the tubular members and in which anti-friction bearings with their appurtenances are mounted directly between the wheels and the axle rather than between the tubular member and the axle so that when the wheels are forced onto the ends of the tubular members under pressure any shrinkage or distortion of the ends of the tubular members would have no effect upon the proper fitting of the bearings and the wheels may be dismounted and remounted without destroying the fit of the bearing in its seat.

With the above and other objects in view, the invention may be said to comprise the structure as illustrated in the accompanying drawing hereinafter described and particularly set forth in the appended claims, together with such variations and modifications thereof as will be apparent to one skilled in the art to which the invention appertains.

Figure 1:
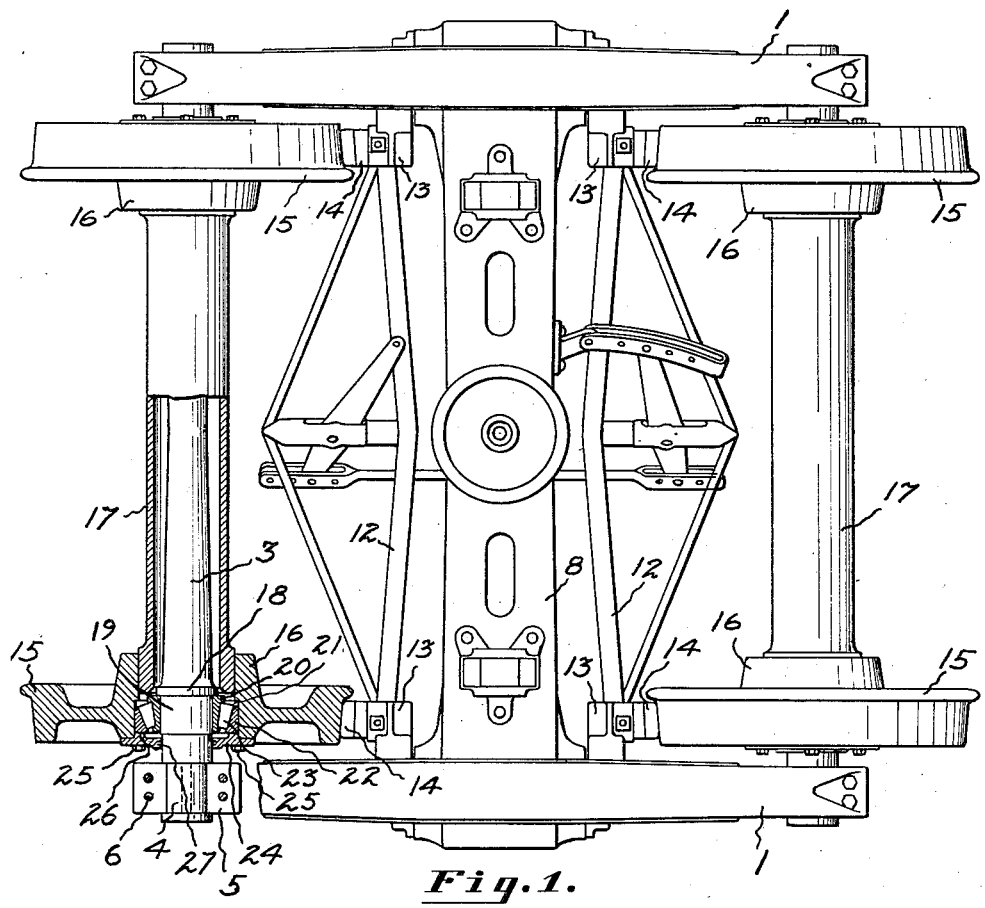

Reference should be had to the accompanying drawing forming a part of the specification in which Figure 1 is a top plan view of the truck with one corner portion broken away to show the connection between the wheel and tubular connecting member and the mounting of the wheel unit on the axle.

Figure 2:
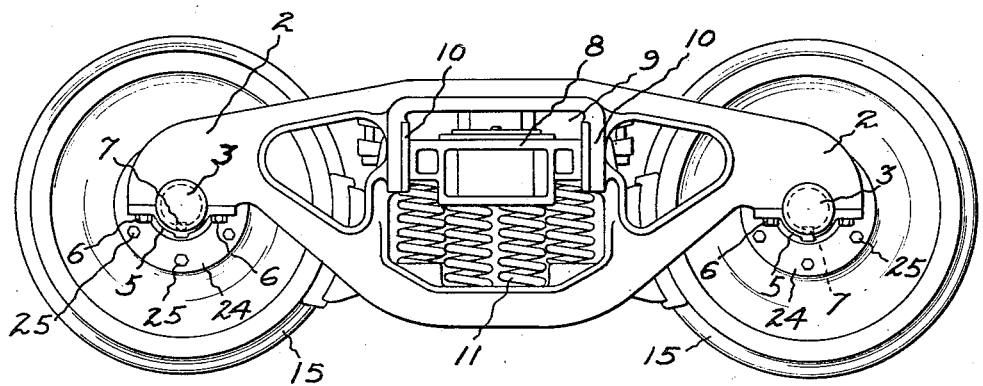

Fig. 2 is a side elevation of the truck.

Referring to the accompanying drawing, the car truck of the present invention is provided with longitudinal side frame members 1 of truss form, which have projecting end portions 2 which overlie the front and rear axles 3. The end portions 2 of the side frames have semi-cylindrical recesses on their under sides which fit in peripheral grooves 4 of the axles adjacent the ends thereof and the side frame members are fastened to the axles by means of removable half bearings 5 which fit over the under side of the axles in the grooves 4 thereof and are detachably secured to the bottom faces of the end portions 2 of the side frame members by means of bolts 6. The ends of the axles are thus clamped, in the grooved portions 4 thereof, between the half bearings of the frame members so that the frame members are positively held against relative movement longitudinally of the axles. The axles are preferably locked against rotation in the frame members by means of keys 7 which may be carried by the axle and fit in transverse grooves formed in the half bearings 5.

Midway between the ends of the truck, the usual transverse bolster 8 is provided, the ends of the bolster projecting through bolster receiving openings 9 in the side frame members which are provided with bolster guides 10 which receive opposite side portions of the bolster to guide the same in its vertical movements. The bolster is supported at each end upon the usual nest of springs 11, these springs being compression coil springs seated on suitable bases or seats carried by the side frame members and bearing at their upper ends upon the under side of the bolster.

The truck is provided with the usual brake beams 12 of standard form which are flexibly suspended from brackets 13 projecting inwardly from the frame members 1 to the front and rear of the bolster receiving openings. Any suitable or convenient means may be provided for shifting the brake beams to bring the shoes 14 carried thereby in contact with the treads of wheels 15.

The axially alined wheels 15 at the front and at the rear of the truck are rotatably mounted upon the supporting axles 3 and each pair of axially alined wheels is connected together for simultaneous rotation. Each wheel 15 has an inwardly projecting hub portion 16 which has a bore of suitable diameter to receive the ends of a tubular connecting member 17, by which the wheels on the opposite sides of the truck are connected. The tubular member 17 has an internal diameter sufficient to permit the axle to be slipped endwise through the wheel unit composed of the two wheels 15 and tubular connecting member 17. Each axle 3, adjacent each end of the tubular member 17, is provided with a peripheral rib 18 which forms a thrust shoulder, and outwardly of this thrust shoulder has a cylindrical portion 19 adapted to receive an inner race ring 20 of an anti-friction bearing. The tubular member 17 projects only part way through the hubs of the wheels and the outer portions of the hubs are provided with counter bores 21 which, as herein shown, are of slightly greater diameter than the bore at the inner ends of the hubs and, slidably mounted in the counter bore 21 of each wheel, there is an outer race ring 22. The inner race ring 20 is externally conical tapering outwardly toward the outer end of the axle and the outer race ring is internally conical and also tapers outwardly. Conical bearing rollers 23 are interposed between the inner and outer race rings 20 and 22. The outer race ring 22 is adjustable in the bore 21 and is held in place by means of a retaining ring 24, which is attached by means of bolts 25 to the outer end of the hub, this ring being provided with an inwardly projecting rib 26 which fits within the bore 21 and engages the outer edge of the race ring 22. When the bearing is assembled, the race ring 22 is forced into the bore 21, as the bolts 25 are tightened to draw the ring 24 toward the wheel.

The retaining rings 24 have their inner edges closely overlying the axles 3 and are provided with circumferential grooves 27 so that each ring 24 serves as an oil retaining ring for retaining lubricant in the adjacent bearing as well as a retaining ring for the bearing.

In the operation of the truck, lateral thrusts are transmitted to the wheel units through the thrust shoulders 18 which engage the inner race rings 20, but these race rings are positively held against outward movement by the outwardly tapering conical surfaces of the outer race rings 22 and the conical rollers interposed between the race rings, each bearing thus serving as a thrust bearing to receive end thrusts of the axle.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A railway car truck having supporting wheels at opposite sides thereof and side frame members at the outer sides of said wheels, a tubular member interposed between supporting wheels at opposite sides of the truck, and rigidly secured at its ends in the hubs of said wheels, an axle extending through said tubular member and the hubs of the wheels, said axle being non-rotatably secured at its ends to said frame members and holding said members against relative movement longitudinally of the axle, and an anti-friction bearing interposed between each wheel and said axle, each bearing including an outer race ring mounted in the wheel hub outwardly of the end of said tubular member.

2. In a railway car truck, a tubular member, a wheel rigidly secured upon said tubular member at each end thereof, an axle extending through said tubular member and through the hubs of said wheels, an internally conical outwardly tapering outer race ring mounted in the hub of each wheel, an externally conical outwardly tapering inner race ring mounted on the axle within each of the outer race rings, bearing rollers interposed between said race rings, thrust shoulders on said axle for limiting inward movement of either of said inner race rings with respect to the axle, and retaining rings detachably secured to the hubs of the wheels and engaging the outer sides of the outer race rings.

3. In a railway car truck, laterally spaced coaxial supporting wheels, a tubular member interposed between said wheels, said tubular member being coaxial with said wheels and rigidly attached at its ends thereto, an axle extending through said tubular member and through the hubs of said wheels, said axle having adjacent each end a circumferential rib of less diameter than the internal diameter of said tubular member, an outwardly tapering externally conical inner race ring mounted on said axle to the outer side of each of said ribs, an internally conical outwardly tapering outer race ring in the hub of each wheel and encircling each of said first mentioned race rings, bearing rollers interposed between said race rings, and retaining rings bolted to the outer ends of the wheel hubs, each retaining ring bearing against an outer race ring.

4. In a railway car truck, a tubular member, a wheel rigidly secured upon said tubular member at each end thereof, an axle extending through said tubular member and through the hubs of said wheels, an internally conical outwardly tapering outer race ring mounted in the hub of each wheel, an externally conical outwardly tapering inner race ring mounted on the axle within each of the outer race rings, bearing rollers interposed between said race rings, thrust shoulders on said axle for limiting inward movement of either of said inner race rings with respect to the axle, and retaining rings detachably secured to the hubs of the wheels and engaging the outer sides of the outer race rings, said retaining rings closely overlying said axle outwardly of the roller bearings to retain lubricant in said bearings.

5. In a railway car truck, a tubular member, a wheel rigidly secured upon said tubular member at each end thereof, an axle extending through said tubular member and through the hubs of said wheels, and thrust resisting anti-friction bearings interposed between each wheel and axle, each bearing comprising an outer race ring adjustably mounted in the wheel hub, an inner race ring mounted on the axle within the outer race ring, and anti-friction bearing members interposed between said race rings, said axle having thrust shoulders engaging the inner race rings and said wheels being provided with means for holding said outer race rings against outward movement.

6. A railway car truck having supporting wheels at opposite sides thereof and side frame members at the outer sides of said wheels, a tubular member interposed between supporting wheels at opposite sides of the truck, and rigidly attached at its ends to said wheels, an axle extending through said tubular member and the hubs of the wheels, said axle being rigidly secured at an end to a side frame member, and an anti-friction bearing interposed between each wheel and said axle and mounted independently of said tubular member.

7. A railway car truck having supporting wheels at opposite sides thereof and side frame members at the outer sides of said wheels, a tubular member interposed between supporting wheels at opposite sides of the truck, and rigidly secured at its ends in the hubs of said wheels, an axle extending through said tubular member and the hubs of the wheels, said axle being non-rotatably secured at its ends to said frame members, and an anti-friction bearing interposed between each wheel and said axle, said bearings being mounted within the hubs of said wheels outwardly of the ends of said tubular member.

In testimony whereof I affix my signature.
CLAUS J. WERNER CLASEN.